United States Patent
Yuzurihara et al.

(10) Patent No.: US 7,570,563 B2
(45) Date of Patent: Aug. 4, 2009

(54) OPTICAL RECORDING METHOD OF A PHASE-CHANGE OPTICAL RECORDING MEDIUM HAVING IMPROVED RECORDING CHARACTERISTICS AND UNIFORMITY AND OPTICAL RECORDING MEDIUM AND OPTICAL RECORDER USED BY THE METHOD

(75) Inventors: Hajime Yuzurihara, Odawara (JP); Hiroshi Deguchi, Yokohama (JP); Katsuyuki Yamada, Zama (JP); Shinya Narumi, Yokohama (JP); Mikiko Abe, Kawasaki (JP); Eiko Hibino, Yokohama (JP); Hiroshi Miura, Yokohama (JP)

(73) Assignee: Ricoh Company, Ltd, Tokyo (JP)

( * ) Notice: Subject to any disclaimer, the term of this patent is extended or adjusted under 35 U.S.C. 154(b) by 543 days.

(21) Appl. No.: 11/353,000

(22) Filed: Feb. 14, 2006

(65) Prior Publication Data
US 2006/0187789 A1 Aug. 24, 2006

Related U.S. Application Data

(63) Continuation of application No. PCT/JP2004/012102, filed on Aug. 24, 2004.

(30) Foreign Application Priority Data

Aug. 27, 2003 (JP) ............................. 2003-303583
Feb. 6, 2004 (JP) ............................. 2004-031369

(51) Int. Cl.
*G11B 7/0045* (2006.01)
(52) U.S. Cl. ................................. 369/59.11; 369/53.34
(58) Field of Classification Search ........................ None
See application file for complete search history.

(56) References Cited

U.S. PATENT DOCUMENTS 6,149,999 A * 11/2000 Suzuki et al. .............. 428/64.1
6,459,666 B1 10/2002 Yokoi
6,480,449 B1 * 11/2002 Narumi et al. ........... 369/47.53

(Continued)

FOREIGN PATENT DOCUMENTS

CN 1355526 6/2002

(Continued)

OTHER PUBLICATIONS

Chinese Office Action dated May 18, 2007.

*Primary Examiner*—Andrea L Wellington
*Assistant Examiner*—Peter Vincent Agustin
(74) *Attorney, Agent, or Firm*—Dickstein Shapiro LLP

(57) ABSTRACT

The object is to provide an optical recording method improving the recording characteristics and uniformity in a CAV recording on a phase-change optical recording medium, particularly a high-speed rewritable DVD medium, and a phase-change optical recording medium and an optical recording apparatus used by the method. Regarding a recording method for recording on the phase-change optical recording medium where a recording light comprises a pulse string of heating and cooling pulses, and a light for erasing, an irradiation power is controlled by peak power (Pp), bottom power (Pb) and erase power (Pe), at least any one of Pe/Pp, Pp, Pb and Pe is variable from the minimum to maximum recording linear velocities allowed for the medium, and further the irradiation time of each pulse is varied proportionally with clock T corresponding to a recording linear velocity, the present invention provides an optical recording method which performs a recording by varying at least Pe/Pp from a specific recording linear velocity lower than a peculiar recording linear velocity at which the recording linear velocity degrades abruptly showing a local maximum value, and an optical recording medium and an optical recording apparatus used by the method.

9 Claims, 5 Drawing Sheets

U.S. PATENT DOCUMENTS

| | | | |
|---|---|---|---|
| 6,510,117 B2 * | 1/2003 | Chang | 369/59.13 |
| 2002/0098315 A1 | 7/2002 | Tabata | |
| 2003/0067852 A1 * | 4/2003 | Tsukihashi et al. | 369/44.38 |
| 2003/0090981 A1 | 5/2003 | Yokoi | |

FOREIGN PATENT DOCUMENTS

| | | |
|---|---|---|
| EP | 1 498 885 A2 | 1/2005 |
| JP | 2001-118245 | 4/2001 |

* cited by examiner

OPTICAL RECORDING METHOD OF A PHASE-CHANGE OPTICAL RECORDING MEDIUM HAVING IMPROVED RECORDING CHARACTERISTICS AND UNIFORMITY AND OPTICAL RECORDING MEDIUM AND OPTICAL RECORDER USED BY THE METHOD

CROSS-REFERENCE TO RELATED APPLICATIONS

This is a continuation of Application No. PCT/JP2004/012102, filed on Aug. 24, 2004.

BACKGROUND OF THE INVENTION

1. Field of the Invention

The present invention relates to an optical recording method which enables recording in a phase-change optical recording medium with a wide range of recording linear velocity, a phase-change optical recording medium and an optical recording apparatus which are used for the optical recording method.

2. Description of the Related Art

A phase-change optical recording medium (hereinafter referred to as 'phase-change optical information recording medium', 'optical recording medium', 'optical information recording medium', and 'information recording medium') is applied in a high-density and high-capacity optical recording medium having a capacity of 20 GB or greater which uses a CD, a DVD and moreover an LD (laser diode) having a wavelength of 400 nm. Technology to record at further higher speed has been desired particularly for the CD and the DVD as a rewritable optical recording medium. The speed has been considerably increased for CDs, and at present there is an increasing demand for the speeding up for rewritable DVDs. Among the DVDs, 2.4× speed has already been put into practical use for DVD+RW medium, which is one type of the rewritable DVDs; recording linear velocity of 4× speed, further 8× speed and faster is currently demanded.

In this case, it becomes a problem to what extent optical recording apparatuses coming in the market corresponds to the speeding up even though the phase-change optical recording medium can be used practically for the high speed recording. The number of rotations of a spindle motor for rotating the optical recording medium in the optical recording apparatus to perform a high speed recording is increasing and has reached 10,000 rotations (rpm) or more. Therefore, it is necessary to reduce disc surface deviation, disc eccentricity and warp of the optical recording medium by performing even more stable rotational control. Moreover, improvement in a servo control of a pick up for focusing and stably tracking grooves in which recording is to be done has been required.

However, in the current situation, there are limitations on these functions, and particularly the number of rotations of an inner circumference side of the phase-change optical recording medium cannot be increased to be more than required for a high-speed recording. Therefore, in order to perform a high-speed recording, a so-called CAV (Constant Angular Velocity: the number of rotations is constant) recording method has been adopted, where the recording takes place at a maximum recording linear velocity on the outer circumference side. In this CAV recording method, since the recording linear velocity changes according to a recording position in the same optical recording medium, it is necessary that the recording can be performed with favorable recording characteristics as well as uniformly.

When the recording linear velocity exceeds 10× speed and approached even to a higher velocity such as 16×, the CAV recording becomes difficult because the linear velocity goes on increasing continuously,. Optimum recording conditions of the phase-change optical recording medium can be found for any linear velocity at high speed. However, the pulse of a laser driving circuit in the optical recording apparatus becomes difficult to control while recording by varying the optimum recording conditions continuously. Therefore, in the high speed recording, a recording with a CLV (Constant Linear Velocity: linear velocity is constant) recording method at a constant linear velocity is more reliable. However, when the CLV recording is used and an attempt is made to record information of a certain address, a load of changing the number of rotations increases according to a position. Therefore, it can be taken into consideration that a ZCLV method may be adopted instead of the CAV recording and the CLV recording, where the linear velocity is set at a constant value for each of the several zones of the phase-change optical recording medium. In any case, it is necessary to have favorable recording characteristics and to record uniformly at each recording linear velocity.

On the other hand, an optimization of the phase-change optical recording medium is necessary for enabling the high speed recording. To correspond to a wide range of recording linear velocity as mentioned above, it is necessary to use a phase change recording layer material with which mark formation is easy at any of a high recording linear velocity and a low recording linear velocity, and furthermore, it is necessary to use a favorable erasing ratio for improving overwriting characteristics. However, when the phase-change optical recording medium is adjusted such that the characteristics are achieved at the maximum recording linear velocity, for not to lose the repeated overwriting properties, a phase-change recording layer with a material and composition having high erasability, in other words, high crystallization speed at a high recording linear velocity, are to be used.

Moreover, while forming a mark at a low recording linear velocity, a high write power is required for narrowing the width of an optical pulse which applies a write power. Furthermore, it is necessary to form the mark by irradiating a high write power at the maximum recording linear velocity since the crystallization speed is high and the temperature of the phase-change recording layer is not prone to rise.

To solve such issues, Japanese Patent Application Laid-Open (JP-A) No. 2001-118245 discloses, for example, in the CAV recording method in which the optical recording medium is rotated at a constant angular velocity and the recording linear velocity increases from the inner circumference to the outer circumference, a laser beam irradiated to the optical recording medium is controlled by three values, namely power corresponding to a heating pulse and a cooling pulse and an erase power, and the width of the heating pulse in a pulse string, which is comprised of the heating pulse and the cooling pulse, and the duty ratio of the final pulse section of the cooling pulse are varied according to the recording linear velocity. Moreover, the literature discloses a recording method to achieve uniform and favorable characteristics from the inner circumference to the outer circumference by recording while varying the ratio of the write power (Pw) and the erase power (Pe) Pe/Pw at a predetermined interval.

Moreover, among the CAV recordings in which the recording linear velocity of the optical recording medium increases from the inner circumference to the outer circumference, JP-A No. 2003-019868 proposes a recording method regarding a ZCAV method, which divides the medium into multiple zones according to a certain radius regions, where the write power irradiation time of a pulse string of the irradiated light, the bias power irradiation time, the write power, the ratio of the erase power and the write power and the bias power are set lo variable according to the zone, and at least the write power irradiation time is to be reduced monotonously from the inner circumference to the outer circumference.

Moreover, DVD+RW 4.7 GB Basic Format Specifications version 1.2' (1×-4× DVD+RW standards) adopts the CAV/CLV recording methods, and it discloses that, in the CAV recording method, the optimum recording conditions (optical pulse control parameters and Pe/Pw ratio) are imparted to each of three linear velocities, namely the minimum recording linear velocity, the maximum recording linear velocity and a mean recording linear velocity which is halfway between the minimum recording linear velocity and the maximum recording linear velocity in each of the recording linear velocity ranges, 1.65× to 4× and 1× to 2.4×.

However, none of the Japanese Patent Application Laid-Open (JP-A) No. 2001-118245 and JP-A No. 2003-019868 as well as DVD+RW 4.7 GB Basic Format Specifications version 1.2' (1×-4× DVD+RW standards) discloses or suggests findings related to a peculiar recording linear velocity while performing the recording with the maximum speed and the solutions thereof, and in the current situation further improvement and development is expected.

SUMMARY OF THE INVENTION

The present invention is made in view of such current situation, and it is an issue of the present invention to solve the problems hitherto faced mentioned above and to achieve the following objects. In other words, it is an object of the present invention to provide an optical recording method which improves the recording characteristics and the uniformity by devising a recording method for performing the CAV recording on a phase-change optical recording medium, particularly on a high-speed rewritable DVD medium, a phase-change optical recording medium and an optical recording apparatus which are used in the optical recording method.

Another object of the present invention is to enable recording on a the phase-change optical recording medium for the high-speed recording even when an optical recording apparatus which performs recording on an optical recording medium at a low recording linear velocity, which can record with smaller write power is used; i.e. to enable a lower drive compatibility. An optical recording medium which is designed to prioritize the characteristics at the maximum recording linear velocity has a sensitivity degraded at the low recording linear velocity, and the optical recording medium is not practical. In view of this, still another object of the present invention is to provide an optical recording method which can record with a favorable sensitivity from a low speed up to a high speed by selecting a material for which an erasing ratio is in a range from the minimum recording linear velocity to the maximum recording linear velocity (a half of the sum of the maximum recording linear velocity and the minimum recording linear velocity).

Furthermore, as a phase-change optical recording medium, it is desirable to use a material which can be crystallized with high speed when the phase-change recording layer is heated once up to near the melting point or over the melting point and then re-crystallized after melting. When the light is irradiated with a high erase power, however, the mark formation is prioritized and becomes less prone to erasing as the velocity approaches the maximum recording linear velocity. In this range, it is necessary to lower the erase power and to allow crystallization from a state where the phase-change recording layer is not sufficiently melted. Therefore, a phenomenon in which the characteristics are abruptly degraded is observed near a recording linear velocity (near a peculiar recording linear velocity which will be described hereinafter) in a region from the vicinity of the mean recording linear velocity to the maximum recording linear velocity, where two crystallization modes exist depending on the value of the erase power (FIG. 6).

In view of this, in the present invention, it is another object to provide an optical recording method and an optical recording apparatus which can record with a favorable sensitivity as well as uniformly independent of a recording position without much degradation of recording characteristics near the peculiar recording linear velocity while recording using a lower drive in the CAV recording with a high-speed phase-change optical recording medium.

The present invention is based on the findings mentioned above by inventors of the present invention, and the means for solving the issues mentioned above are as follows:

<1> A recording method of a phase-change optical recording medium for performing a recording on the phase-change optical recording medium comprising a phase-change recording layer on a substrate, where a light irradiated on the phase-change optical recording medium comprises a pulse string of heating pulses and cooling pulses, and a light for erasing; an irradiation power is controlled by three values, namely a peak power (Pp) which is the irradiation power of a heating pulse, a bottom power (Pb) which is the irradiation power of a cooling pulse and an erase power (Pe) for erasing a recording mark; and at least any one of Pe/Pp, Pp, Pb and Pe is set variable within a range from the minimum recording linear velocity to the maximum recording linear velocity of the phase-change optical recording medium, and further the recording is performed by varying an irradiation time of each pulse in proportion with a clock T corresponding to the recording linear velocity, wherein the optical recording method performs a recording by varying at least Pe/Pp from a specific recording linear velocity which is lower than the peculiar recording linear velocity, where the peculiar recording linear velocity is a recording linear velocity at which jitter degrades abruptly to show the local maximum value.

<2> The optical recording method according to <1>, wherein the specific recording linear velocity is a recording linear velocity lower by 0.5 m/s or more than the peculiar recording linear velocity.

<3> The optical recording method according to any one of <1> to <2>, wherein the optical recording method performs at least any one of a recording, a reproducing, an erasing and a rewriting of information by a reversible phase change of an amorphous phase and a crystal phase in the phase-change recording layer.

<4> The optical recording method according to any one of <1> to <3>, wherein the recording in the phase-change optical recording medium is performed by a CAV recording method.

<5> The optical recording method according to any one of <1> to <4>, wherein the recording is performed by further changing Pe.

<6> The optical recording method according any one of <1> to <5>, wherein one of Pe/Pp and Pe at the specific recording linear velocity is equal to or greater than one of Pe/Pp and Pe at the maximum recording linear velocity.

<7> The optical recording method according to any one of <1> to <6>, wherein any one of Pe/Pp and Pe between two <8> A phase-change optical recording medium which is used in the optical recording method according to any one of <1> to <8>.

<9> The phase-change optical recording medium according to <8>, wherein at least any one of Pe/Pp, Pe and recording conditions at the recording linear velocity selected from the minimum recording linear velocity, the mean recording linear velocity, the maximum recording linear velocity and the specific recording linear velocity, and combinations thereof is recorded in advance as information.

<10> The phase-change optical recording medium according to any one of <8> to <9>, wherein the phase-change optical recording medium comprises a substrate and on the substrate a first protective layer, a phase-change recording layer, a second protective layer and a reflective layer in this order or a reverse order, and at least any one of recording, reproducing, erasing and rewriting of information on the phase-change optical recording medium performs by the irradiation of a laser beam from the side of the first protective layer.

<11> The phase-change optical recording medium according to any one of <8> to <10>, wherein the phase-change recording layer comprises one selected from Ag, Ge, Sn, Sb, Ga, Mn, Zn, Te and In.

<12> An optical recording apparatus which performs a recording at a recording linear velocity of 3 m/s to 56 m/s using the optical recording method according to any one of <1> to <7>.

<13> The optical recording apparatus according to <12>, wherein the optical recording apparatus comprises a peculiar recording velocity, which is a recording linear velocity at which jitter abruptly degrades to show a local maximum value, and a test zone which is allocated on the inner side or outer side of the date region used by a user based on the information detected in the phase-change optical recording medium on which the information regarding the peculiar recording velocity and the optimum recording conditions have been recorded in advance, and the optical recording apparatus comprises a means to perform a test recording in the test zone at a linear velocity ranging up to ±2 m/s of the peculiar recording linear velocity.

DESCRIPTION OF THE PREFERRED EMBODIMENTS

Optical Recording Method the optical recording method of the present invention shows the following aspects in recording on a phase-change optical recording medium: a light irradiated on the phase-change optical recording medium comprises a pulse string of heating pulses and cooling pulses, and a light for erasing; an irradiation power is controlled by three values namely a peak power (Pp) which is an irradiation power of the heating pulse, a bottom power (Pb) which is an irradiation power of the cooling pulse, and an erase power (Pe) for erasing a recording mark; within a range from the minimum recording linear velocity to the maximum recording linear velocity of the phase-change optical recording medium, at least any one of Pe/Pp, Pp, Pb and Pe is set variable; further, an irradiation time of each pulse is varied in proportion with a clock T for recording linear velocity; the recording is performed by varying at least Pe/Pp from a specific recording linear velocity which is lower than the peculiar recording linear velocity, which is a recording linear velocity at which jitter degrades abruptly to show its local maximum value; and further the method comprises other processes according to the requirement.

Here, a phase-change optical recording medium ranging from a CD-RW, DVD-RW, DVD+RW and DVD-RAM to a next-generation large-capacity medium on which recording and reproducing are performed using an LD of 400-nm wavelength has been predominant as a rewritable optical disc. For a CD-R and a CD-RW comprising an organic dye, a high-speed recording medium of 2.4× speed and more has already been used practically, and in a rewritable DVD which has been building up a large market recently, a study of further speeding up is started already. The 2.4× speed has already been attained and is commercially available for the DVD+RW medium, which is one of the rewritable DVDs. Furthermore, a study in which a 4× speed to 8× speed is put in perspective is underway.

Figure 1:
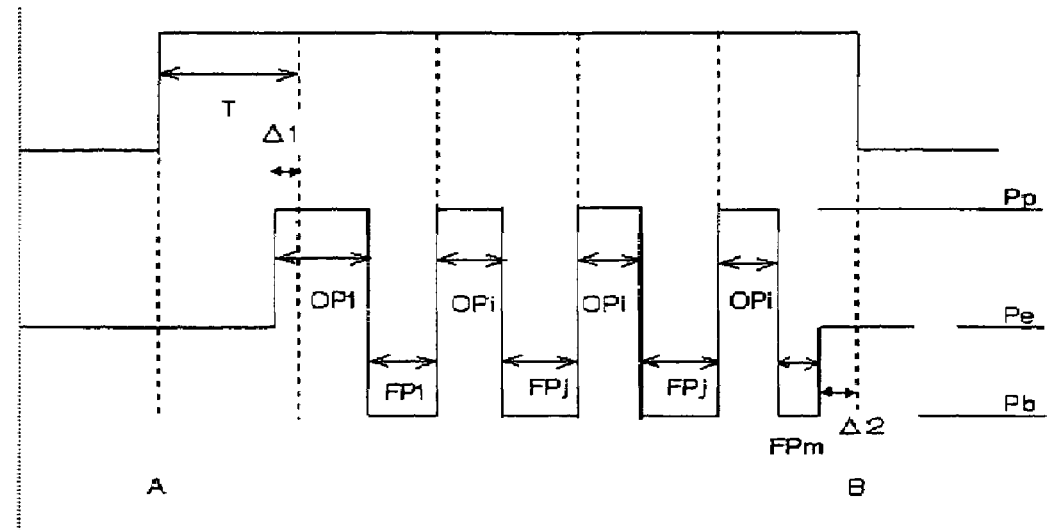
FIG. 1 is a diagram showing an example of an optical recording method used for CD-RW and DVD+RW.

At present, in a recording method used in CD-RW and DVD+RW, as shown in FIG. 1, a light irradiated on an optical recording medium comprises a pulse string of heating pulses and cooling pulses, and a light for erasing; and a recording is performed by controlling the irradiation power with three values, namely the peak power (Pp) which is the irradiation power of the heating pulse, the bottom power (Pb) which is the irradiation power of the cooling pulse and the erase power for erasing the recording mark between these pulse strings. Moreover, the number of heating pulse portions and cooling pulse portions is determined according to the length of the recording mark.

In a DVD, for example, 10 types of marks having a short mark length of 3 T, 4 T, 5 T, 6 T, 7 T, 8 T, 9 T, 10 T, 11 T and 14 T are recorded with respect to a reference clock T (hereinafter, also referred to as a window width), where T is a mark length and is 0.4 μm. When each mark length is supposed to be nT, where n denotes a natural number, the number of heating pulses m, where m denotes a natural number, is any one of n-1 and n-2. The heating pulse portion further controls the pulse width independently at a leading portion and intermediate portions. Moreover, the width of a cooling pulse portion at an end is controlled independently of the width of a previous cooling pulse.

In other words, each of the following conditions are optimized: the width of the leading heating pulse OP1, the width of the subsequent heating pulse (OPi:i=2 to n-1), the width of the leading cooling pulse (FP1), the width of an intermediate cooling pulse (FPj, except in a case of 3 T), the width of the final cooling pulse (FPm), the peak power (Pp), the erase power (Pe) and the bottom power (Pb). As a general rule, the sum of the width of the intermediate heating pulse and the width of the cooling pulse is let to be T.

In case of 4× speed, i.e. for a recording velocity of 14 m/s or greater, when the rise time and the fall time of a pulse are slow due to the low intensity of the maximum output laser beam, the pulse time is extended to compensate for the insufficient recording sensitivity, and the number of pulses is reduced or the number of pulses and the pulse width are adjusted for each mark.

In order to correspond to the CAV recording, the heating pulse width is adjusted by a time period which comprises a portion proportional to the window width T set according to each recording linear velocity and a fixed portion. The cooling pulse width is also controlled by proportionating it to the window width T. The erase power is determined by the peak power and the ratio Pe/Pp.

Although different values of Pe//Pp are assigned conventionally to each of the minimum recording linear velocity, the maximum recording linear velocity and the mean recording linear velocity, an identical value of Pe/Pp may be used for all.

When an optical recording medium, comprising a first protective layer a first protective layer, a phase-change recording layer, a second protective layer and a reflective layer disposed in this order on a substrate which is provided with a guide groove, is irradiated continuously with an erasing power which is equal to or greater than the optimal erase power at a varying recording linear velocity, the reflected signal (reflectivity) of the medium starts decreasing at a certain recording linear velocity, and upon further varying the reflected signal further decreases as the recording linear velocity increases. The upper limit of the erase power is about 50% of the maximum write power which can be output by the optical recording apparatus and the erase power in this range is irradiated continuously.

When the recording linear velocity is increased gradually in a range of 3.5 m/s to 14 m/s while irradiating a light having a power of 11 mW, the reflectivity of the optical recording medium is monitored. At a recording linear velocity of 10.5 m/s, the reflectivity decreases, or an amorphous layer is formed from the central portion of the groove. A portion where the reflectivity decreases and a portion where the reflectivity does not decrease are mixed, and the reflected signal gains width. When the recording linear velocity is further increased, the reflectivity keeps decreasing notably. The recording linear velocity at which the reflectivity starts decreasing is referred to as a transition recording linear velocity.

While performing a CAV recording on an optical recording medium which is capable of recording in a wide range of 1× speed to 4× speed of the DVD, the recording takes place separately for a case where the innermost circumference has a velocity of 1× (3.5 m/s) and the outermost circumference has a velocity of 2.4× (8.4 m/s) and for a case where the innermost circumference has a velocity of 1.65× (5.8 m/s) and the outermost circumference has a velocity of 4× (14 m/s). Here, the innermost circumference indicates a radial position of 24 mm, and the outermost circumference indicates a radial position of 58 mm.

Particularly, regarding the 1× speed to 2.4× speed, it is necessary to perform recording at the surface of 15 mW to 16 mW when the recording is performed with the same upper limit write power as that of the conventional optical recording medium which is optimized for the velocity of 2.4×,.

On the other hand, the 4× speed has the upper limit write power of 22 mW. When recording at a velocity of 1× speed to 4× speed is performed with the write power of up to 22 mW, the optical recording medium is such that the transition recording linear velocity is lower by 1 m/s to 2 m/s than the maximum recording linear velocity. In this case, the transition recording linear velocity is set at 12 m/s to 13 m/s.

The transition recording linear velocity of a DVD+RW 4× speed optical recording medium, which is backward compatible with a conventional drive for 2.4× speed recording, is preferably in a range of about 10 m/s to 11.0 m/s. In a range from the minimum recording linear velocity (5.8 m/s in this case) to the mean recording linear velocity, Pe/Pp with respect to the optimum peak power in irradiating the erase power up to a level where the phase-change recording layer melts is 0.3 to 0.6, and preferably 0.40 to 0.55. Particularly in this range of recording linear velocity, to achieve recording characteristics equivalent to one-time recording even though the number of overwriting is increased, the temperature is raised close to the melting point of the phase-change recording layer, and the state is used at which the speed of crystal growth is maximized, thereby achieving favorable characteristics with no residual marks.

On the other hand, when the recording linear velocity is 4× speed or greater, Pe/Pp is preferably 0.2 to 0.4, and more preferably 0.25 to 0.35.

Figure 6:
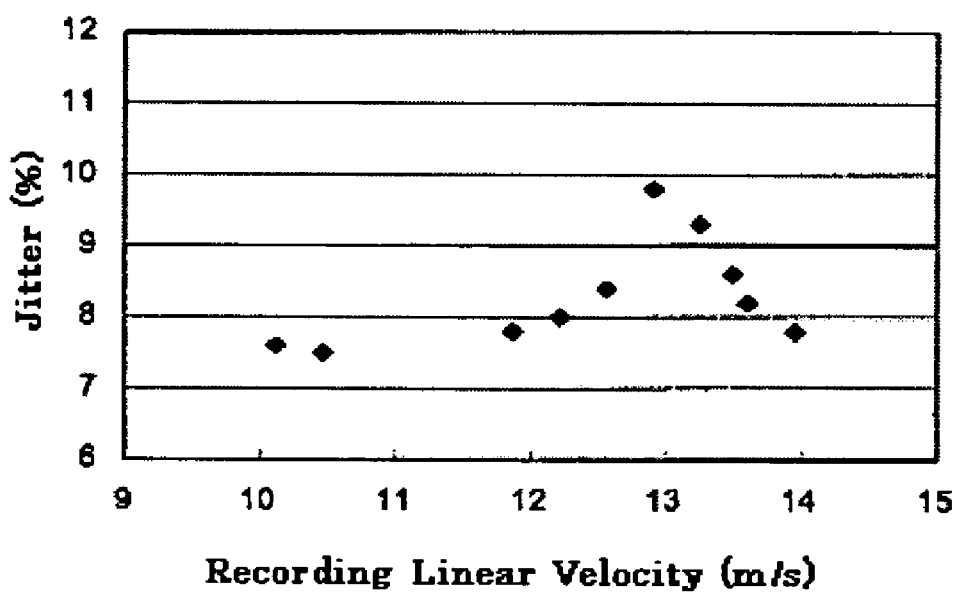
FIG. 6 is a diagram showing the relation of jitter and the recording linear velocity of a phase-change optical recording medium prepared in Example 1.

When Pe/Pp of the mean recording linear velocity (9.9 m/s in this case) is supposed to be 0.5 (Pp: 19 mW; Pe: 8.5 mW) and Pe/Pp of the maximum recording linear velocity is supposed to be 0.3 (Pp: 19.0 mW; Pe: 5.7 mW), and when the CAV recording is performed by decreasing Pe/Pp monotonously between these recording linear velocities, a phenomenon occurs where jitter, which is one of the recording characteristics, degrades abruptly near the recording velocity of 12.9 m/s (FIG. 6).

In the present invention, the recording linear velocity at which this degradation phenomenon occurs and the jitter shows the local maximum value is called a peculiar recording linear velocity. Near this peculiar recording linear velocity, in the worst case, data cannot be reproduced even after error correction.

Here, jitter has the following meaning. When a recording mark and a space between marks are scanned by a laser beam for reproducing, by binarizing each reflected signal from the recording mark and the space between the marks at a certain slice level, the reproducing signal is converted to a digital signal of '1' or '0'. At this point, when a time boundary is detected where the signal switches from '1' to '0' or '0' to '1' at the leading portion and the final portion of the recording mark change, and this is let be an edge signal, jitter means a time deviation of the edge signal and the reproducing signal from the reference clock T. Specifically, a center time is T/2, and the jitter is the standard deviation of the center time σ (time) divided by the reference clock T and multiplied by 100; in other words, jitter (%)≡σ×100×T.

Here, regarding a DVD, the reference clock is 38.12 nsec (nano seconds) when the recording linear velocity is 3.49 m/s (1× speed).

In the optical recording method of the present invention, an optical pick-up having an LD with a wavelength of 650 nm and an object lens with a numerical aperture NA of 0.6 to 0.65 is used for a DVD. The recording is performed by a [8-16] modulation method with a recording linear density of 0.267 μm/bit.

In recording and erasing the mark, regarding a laser beam irradiated on the optical recording medium, the time width of each pulse is controlled by alternatively combining the heating pulse portion for irradiating the peak power Pp required for recording to heat the medium and the cooling pulse portion which irradiates the bottom power for irradiating still lower power to form the mark.

When the radial position of the innermost circumference of a data recording area used by a user of the phase-change optical recording medium is 24 mm, the recording linear velocity here is 5.8 m/s, the radial position of the outermost circumference is 58 mm, and the recording linear velocity here is 14 m/s, and the recording linear velocity increases in the recording area between the innermost circumference and the outermost circumference, the recording is performed as follows:

The width of one or more pulse is controlled with a time period proportional to the clock T corresponding to the recording linear velocity or with a time period which is the sum of the time proportional to the clock T and a fixed time. Moreover, the leading portion of the heating pulse portion and the subsequent pulse portions are independently controlled so that the mark length equals the predetermined mark length. The cooling pulse portion is controlled similarly, but the pulses in the leading portion, intermediate portion and final portion are independently controlled for more precise control of the mark length. When overwriting, even more favorable characteristics can be ensured by optimizing the magnitude of these pulse times as well as the peak power, the bottom power and moreover the erase power.

The precision in controlling the pulse width with the time proportional to the clock time T corresponding to the recording linear velocity depends on the performance of a laser beam which is installed in the optical recording apparatus and a driving circuit thereof; the pulse width is controlled as $k \times T/a$, where a part proportional to the pulse time, i.e. a pulse time resolution, is supposed to be a, and k is an integer of zero or greater. For example, when the recording linear velocity is 14 m/s, the pulse width is 4.8 nsec with a=16, T=9.6 nsec and k=8. It is $k \times T/a+b$ when this is controlled by adding a fixed time b. Particularly, in adding the fixed time, favorable recording characteristics can be achieved as compared to a method expressed by $k \times T/a$ when the difference in an optimum pulse width of the minimum recording linear velocity and the maximum recording linear velocity is large. However, with a high recording linear velocity of, for example, 35 m/s as the maximum (10 times that of a DVD), the pulse is not always controlled with common conditions for each mark length. The pulse width is controlled with $k \times T/a$; when and the phase-change recording layer cannot be heated up to near the melting point due to an output power of the laser, changing the number of heating pulses and controlling each pulse time independently according to the mark length are also considered.

In the CAV recording, apart from these controls of the pulse, a controlling method for the recording linear velocity of the erase power (Pe) is more important. To ensure a high frequency of repeated overwriting even at a higher recording linear velocity, the crystallization speed of a material of the phase-change recording layer becomes important. There are limitations at the maximum recording linear velocity on a recording material which enables crystallization at a high speed. Moreover, to ensure high storage ability such that recorded data do not degrade for a long period of time, which is another important factor of an optical recording medium, is a major issue for the phase-change optical recording medium. Therefore, to enable a high speed recording and to cover the wide recording linear velocity as well, it is necessary as mentioned earlier to perform optimization such that the transition recording linear velocity of the optical recording medium is between the maximum recording linear velocity and the minimum recording linear velocity. However, as mentioned earlier, in a certain range of recording linear velocity between the transition recording linear velocity and the maximum recording linear velocity (near peculiar recording linear velocity), a phenomenon that jitter exceeds the reference value occurs. In view of this, the optimum Pe/Pp and Pe, or other optimum recording conditions with a recording linear velocity below peculiar recording linear velocity are determined for which jitter does not degrade or is equal to or below the reference value even near the peculiar recording linear velocity.

Figure 7:
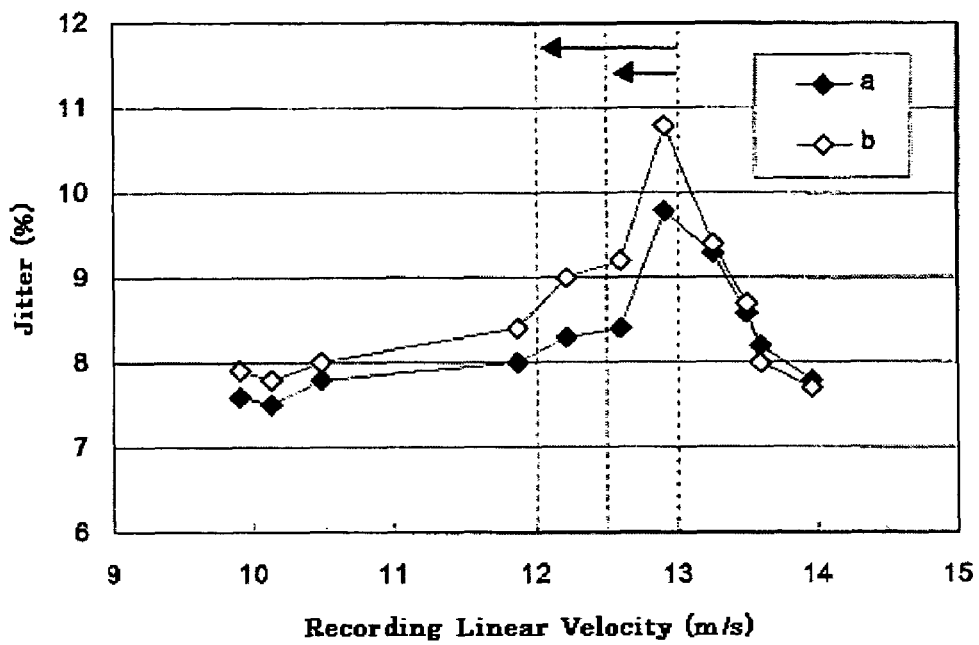
FIG. 7 is a diagram for explaining a specific recording linear velocity lower than a peculiar recording linear velocity.

Here, 'the specific recording linear velocity lower than the peculiar recording linear velocity' is a recording linear velocity which is lower by 0.5 m/s or more than the peculiar recording linear velocity, and it is preferable to select the recording linear velocity lower by 1 m/s or greater. This point is elaborated with reference to FIG. 7; for the jitter with the recording conditions shown in FIG. 6 (legend a of FIG. 7) regarding each recording linear velocity, the values of jitter in recording with the write power increased by 1 mW are indicated by legend b of FIG. 7. When the recording is performed near the optimum write power with Pe/Pp at the linear velocity lower by 0.5 m/s than the peculiar recording linear velocity, the jitter becomes 9% or less. When the write power is increased by 1 mW, the jitter exceeds 9% at a linear velocity lower by 0.5 m/s than the peculiar recording linear velocity. Therefore, it is preferable to lower it by 1 m/s or more.

At a linear velocity between the maximum linear velocity and the vicinity of the mean recording linear velocity, there is an region in which the mode of recrystallization changes in a once-formed amorphous mark or a previous recording mark in case of overwriting when the erase power is irradiated,. In this region with mode changes, the recrystallization proceeds comparatively at the center portion of the groove, but the degradation is further aggravated since the recrystallization speed decreases as it approaches the groove boundary region, and in overwriting the previous mark cannot be erased except at the center portion of the mark. As a method for improving this, it is preferable to lower the erase power from a linear velocity near the linear velocity by 1 m/s than the peculiar recording linear velocity. The transition recording linear velocity of the optical recording medium described above is applicable when the transition recording linear velocity is lower than the maximum linear velocity at which recording in the optical recording medium is to be performed.

For the phase-change recording material, when the crystallization speed is increased for recording at a high linear velocity, rewriting performance tend to degrade due to disappearance and degradation of the recording mark or the degradation of the rewriting performance because of the alteration of the crystal phase in un-recorded state in case the medium has been stored in a high-temperature environment over a long period of time. For example, when the velocity exceeds 8× speed and passes 12× speed, the transition recording linear velocity cannot go higher than the maximum recording linear velocity. In other words, as the recording linear velocity becomes higher, higher write power is required for heating the phase-change recording layer for mark formation up to near the melting point. Moreover, since the recrystallization speed is high, it becomes difficult to control a mark to a predetermined length unless the mark is formed with a sufficient length by quenching after melting. Moreover, as a result of covering the wide range of linear velocity down to a low linear velocity, the cooling speed cannot be maintained when the recording is performed at the low linear velocity. Therefore, it is necessary to elongate complementarily the cooling pulse time (FP in FIG. 1) by shortening the irradiation pulse time (OP in FIG. 1) of the write power (peak power Pp). Ultimately, the shortened irradiation pulse time has to be complemented by the increase in the write power. Therefore, when the transition recording linear velocity is designed to be higher than the recording linear velocity, it is difficult to achieve sufficient characteristics only by the recording method since more and more write power is required and a thermal design of the optical recording medium for quenching the phase-change recording layer is required.

Regarding the CLV recording, the recording is not restricted to take place only at the recordable maximum linear velocity of the optical recording medium. In addition, the higher the maximum linear velocity is, the ZCLV recording, in which the CLV recording is performed at a relatively low linear velocity in the inner circumference side and the CLV recording is performed at the maximum linear velocity in an outer circumference side is used since the number of rotations of the spindle motor of the recording apparatus on an inner circumference side of the optical recording medium increases, may be employed since the number of rotations of the spindle motor of the recording apparatus on the inner circumference side of the optical recording medium increases. In any case, since there is an optical recording medium which has the peculiar recording linear velocity at which jitter degrades, it is necessary to improve this phenomenon. In this case, basically it is preferable to improve by controlling the erase power.

Conventional specifications of the rewritable DVD+RW up to 4× speed assign in advance Pe/Pp for the three linear velocities, namely the minimum recording linear velocity, the mean recording linear velocity and the maximum recording linear velocity as well as other conditions to the optical recording medium. Specifically, on the inner surface of an area (from 24.0 mm to 58 mm) in which the user records data, a sinusoidal groove called ADIP (Address in pre-groove) is formed all over the surface at a cycle of approximately 818 kHz, and a method is employed in which this information is recorded in advance by inverting the phase of a sinusoidal wave by 180°. The recording apparatus reads this information and records these conditions in a control data zone (address number of 02F200) near a radial position of 23.9 mm.

Conditions of each of these recording linear velocities may be the same. When the conditions are different for the three linear velocities, the conditions are linearly reduced or increased between each of the recording linear velocities. However, since optimum conditions are not provided for a recording linear velocity other than the three linear velocities which are specified, it is practically difficult to find out the optimum conditions in the recording apparatus. Therefore, when the degradation of jitter is observed at the mean recording linear velocity and the maximum recording linear velocity from among the three linear velocities, it may be taken into consideration to provide the optimum conditions such that the degradation does not occur at the mean recording linear velocity.

More specifically, it has been found that it is preferable to have Pe/Pp of the mean recording linear velocity equal to Pe/Pp of the maximum recording linear velocity or to have Pe/Pp of the mean recording linear velocity equal to or greater than Pe/Pp of the maximum recording linear velocity. In other words, when Pe/Pp≡ϵ, Pe/Pp at the mean recording linear velocity is let to be ϵ1, and Pe/Pp at the maximum recording linear velocity is let to be ϵ2, it is preferable that ϵ1≧ϵ2. Furthermore, it is preferable ϵ1<0.5, and it is more preferable 1≦(ϵ1/ϵ2)<2. The optimum write power (Pp) is independent of the recording linear velocity and is almost constant; when the magnitude of the Pe itself rather than of Pe/Pp is important, there are cases where the magnitude of Pe is provided as information to the phase-change optical recording medium.

In the present invention, the following (1) and (2) are exemplary methods of providing the optimum recording conditions including Pe/Pp and Pe.

(1) a case which is comprised of the following linear velocities: the minimum recording linear velocity; the mean recording linear velocity; a specific recording linear velocity lower than the peculiar recording velocity and higher than the mean recording linear velocity; and the maximum recording linear velocity (2) a case which is comprised of the following linear velocities: the minimum recording linear velocity, a quasi-mean recording linear velocity, which is a specific recording linear velocity lower than the peculiar recording linear velocity and is not always a simple mean recording linear velocity, the mean of the maximum recording linear velocity and the minimum recording linear velocity, and the maximum recording linear velocity.

(1) is effective when the recording characteristics of the mean recording linear velocity exceed the reference value with the conditions defined by (2). Moreover, the recording conditions may be set additionally between each of the recording linear velocities for improving the uniformity of the recording characteristics according to the recording position.

Furthermore, there is also a method as (3) in which, apart from (1) and (2) mentioned above, information of the peculiar recording linear velocity is stored in advance in the optical recording medium, the optical recording apparatus reads this, and for this linear velocity, no recording is performed in a range of linear velocity of ±0.5 m/s to ±1.0 m/s. Moreover, this method is also effective for ZCLV recording. When the peculiar recording velocity exists among the linear velocities in a zone, where the region from the inner circumference to the outer circumference are divided in several zones in advance, measures can be taken on the side of the recording apparatus such that a linear velocity of a certain zone is recorded at a linear velocity in the range of of ±1.0 m/s of the peculiar recording linear velocity. Moreover, the ZCLV method can also be applied.

Although the description mentioned above is mainly of the case where no recording is performed in the crystal phase and recording is performed in an amorphous phase, the present invention is applicable similarly to a case where recording is performed in the crystal phase and no recording is performed in the amorphous phase. However, since the situation is reversed, when the recording performed in the optical recording medium is the CAV recording, it is preferable to have Pe/Pp at the specific recording linear velocity equal to or less than Pe/Pp at the maximum recording linear velocity or less.

Phase-Change Optical Recording Medium

The phase-change optical recording medium of the present invention comprises a substrate, and at least a first protective layer, a phase-change recording layer, a second protective layer and a reflective layer disposed on the substrate in this order or a reverse order; and other layers according to the requirement. In this case, at least one of a recording, reproducing, erasing, and rewriting is performed on the phase-change optical recording medium by the irradiation of a laser beam from a side of the first protective layer.

It is preferable that at least any one of Pe/Pp, Pe and recording conditions at a recording linear velocity selected from the minimum recording linear velocity, the mean recording linear velocity, the maximum recording linear velocity, and the specific recording linear velocity and a combinations thereof are recorded in advance as information in the phase-change optical recording medium.

Figure 9:
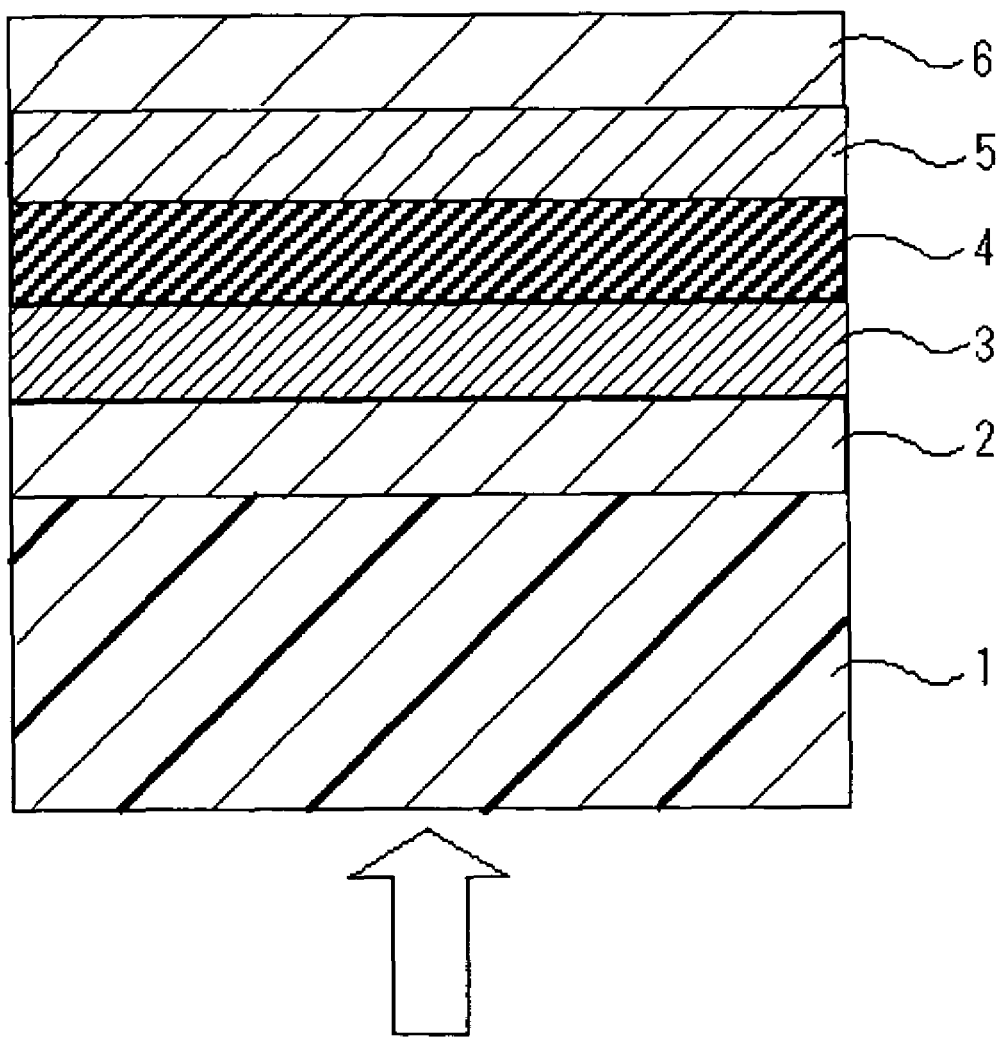
FIG. 9 is a schematic cross-sectional view showing an example of a phase-change optical recording medium of the present invention.

Here, FIG. 9 is a schematic cross-sectional view showing an example of a phase-change optical recording medium of the present invention which includes a substrate 1, a first protective layer 2, a phase-change recording layer 3, a second protective layer 4, a third protective layer 5 and a reflective layer 6 disposed on the substrate 1 in this order. The phase-change optical recording medium can also comprise an interfacial layer between the phase-change recording layer 3 and the first protective layer 2 although it is omitted in the diagram. Furthermore, a protective layer comprising an ultraviolet (UV) curing resin may be formed by a spin coating method on the reflective layer, and according to the requirement, for further strengthening or protection of the phase-change optical recording medium, another substrate may be laminated on the protective layer.

Substrate

Glass, ceramics and resins are used commonly as a material of the substrate 1, but a substrate made of resin is suitable in terms of formability and cost. Examples of the resin include a polycarbonate resin, an acrylic resin, an epoxy resin, a polystyrene resin, an acrylonitrile-styrene copolymer, a polyethylene resin, a polypropylene resin, a silicone resin, a fluorine resin, an ABS resins, and a urethane resin. Among these, the polycarbonate resin and the acrylic resin are particularly preferable in terms of formability, optical properties and cost.

There is no restriction on the thickness of the substrate 1, and it is determined according to the wavelength of a laser beam commonly used and condensing characteristics of a pick-up lens. A CD using a wavelength of 780 nm comprises a substrate having a thickness of 1.2 mm, and a DVD using a wavelength of 650 nm to 665 nm comprises a substrate having a thickness of 0.6 mm.

As a substrate, for example, a polycarbonate resin substrate is suitable, which is in the form of a disc, has a diameter of 12 cm and a thickness of 0.6 mm with a guide groove for tracking on its surface and has excellent processability and optical properties. On the surface of the substrate, a guide groove having a depth of 15 nm to 45 nm, a width of 0.2 μm to 4 μm and a pitch of 0.74 μm is formed in a spiral form. Moreover, the groove portion is meandered at a cycle of approximately 820 kHz or greater, and address information and the recording information are recorded by modulating the phase of the cycle of the meandered groove. Information is reproduced by detecting this phase-change portion and converting it to a binarized signal. The amplitude of this meandered portion is in a range of 10 nm to 50 nm.

Here, an adhesive layer for laminating the substrate 1 in which information signal is written and the laminated substrate is formed with: a double-sided adhesive sheet on which an adhesive is coated on both sides of its base film; a thermosetting resin; or an ultraviolet curing resin. The film thickness of the adhesive layer is usually about 50 μm.

When the adhesive sheet or the thermosetting resin is used as an adhesive, the laminated substrate (dummy substrate) needs not be transparent. However, when the ultraviolet curing resin is used for the adhesive layer, it is preferable to use a transparent substrate which allows an ultraviolet light to pass. It is suitable that the thickness of the laminated substrate is usually 0.6 mm which is the same as the thickness of the transparent substrate 1 on which information signal is written.

First Protective Layer

It is preferable that the first protective layer 2 has a favorable adhesion with the substrate and the phase-change recording layer as well as a high thermal resistance. Moreover, the first protective layer preferably comprises optical properties appropriate for repeated recording at the high linear velocity since it also assumes a role as a light interfering layer which enables the phase-change recording layer to absorb effectively the light.

Examples of a material of the first protective layer include metallic oxides such as $SiO$, $SiO_2$, $ZnO$, $SnO_2$, $Al_2O_3$, $TiO_2$, $In_2O_3$, $MgO$ and $ZrO_2$; nitrides such as $Si_3N_4$, $AlN$, $TiN$, $BN$ and $ZrN$; sulfides such as $ZnS$, $In_2S_3$ and $TaS_4$; carbides such as $SiC$, $TaC$, $B_4C$, $WC$, $TiC$ and $ZrC$; diamond-like carbon; and mixtures thereof. Among these, a mixture of $ZnS$ and $SiO_2$ are preferable. In this case, the mole ratio of $ZnS$ and $SiO_2$ is 50:50 to 90:10, and more preferably 80:20.

Examples of a formation method of the first protective layer 2 include various vapor growth methods such as vacuum vapor deposition method, sputtering method, plasma CVD method, optical CVD method, ion plating method and electron beam vapor deposition method. Among these, the sputtering method is excellent from a point of mass productivity and film quality. Preferable sputtering conditions are, for example, the use of an Ar gas as a film-making gas, an input electric power of 3 kW and the Ar gas pressure (the pressure of a film-making chamber) of $2 \times 10^{-3}$ Torr.

There is no restriction in particular on the film thickness of the first protective layer, and it can be selected appropriately according to an object; the film thickness of 50 nm to 90 nm is preferable.

Phase-Change Recording Layer

There is no restriction in particular on the phase-change recording layer 3 provided that the phase-change recording layer is capable of high-speed recording and has excellent rewriting performance, and it can be selected appropriately according to an object, The phase-change recording layer preferably comprises one of Ag, Ge, Sn, Sb, Ga, Mn, Zn, Te and In. Specific examples are: Ag—In—Sb—Te, Ge—Ag—In—Sb—Te, Ge—In—Sb—Te, Ge—Ga—Sb—Te, Ge—Mn—Sb—Te, Ge—Ga—In—Sb—Te, Ge—Ga—Mn—Sb—Te, Ga—Sb—Te, Ga—Sb—Zn, Ga—Ge—Sb, Ga—Sb—Sn, Ga—Sn—Sb—Te, Ge—Sn—Sb—Te, Ga—Mn—Sb, In—Sb—Te, Ga—Ge—Sn—Sb, Zn—Sn—Sb and Ge—In—Sb.

A material comprising one type selected from Ag, In, Sb, Te and Ge is suitable for 4x speed DVD recording. A material having the following composition ranges (atom percent) is particularly preferable: 0<Ag<3, 0<In<7, 60<Sb<80, 15<Te<30 and 0<Ge<10.

For DVD recording of 4x speed to 16x speed, Ge—Sn—Sb materials, Ga—Sn—Sb materials, Ga—Ge—Sn—Sb materials and In—Sb—Ge materials are preferable; moreover, at least one type selected from Ag, Zn, Te, In, Mn, and rare earth elements may be added with a proportion of 10 atom percent or less. For example, a material having a composition range of 5≦Ge<20, 0<Ga<15, 55<Sb<90 and 5<Sn<25 is preferable.

The film thickness of the phase-change recording layer is preferably 5 nm to 30 nm, and more preferably 10 nm to 20 nm. When the film thickness of the phase-change recording layer is small, sometimes a light absorption capacity degrades, and a function as the phase-change recording layer is lost; when the film thickness is large, the recording sensitivity degrades.

Various vapor growth methods are used as a formation method of the phase-change recording layer such as vacuum vapor deposition method, sputtering method, plasma CVD method, optical CVD method, ion plating method and electron beam vapor deposition method. Among these, the sputtering method is excellent from a point of mass productivity and film quality. Preferable sputtering conditions are, for example, the use of an Ar gas as a film-making gas, an input electric power of 3 kW and the Ar gas pressure (the pressure of a film-making chamber) of $2\times10^{-3}$ Torr. Preferable sputtering conditions are, for example, the use of an Ar gas as a film-making gas, an input electric power of 3 kW and the Ar gas pressure (the pressure of a film-making chamber) of $2\times10^{-3}$ Torr.

Second Protective Layer

It is desirable that the second protective layer 4 has favorable adhesion with the phase-change recording layer and the reflective layer as well as high thermal resistance; moreover, it is more preferable to have optical properties appropriate for repeated recording at the high linear velocity since the second protective layer also assumes a role as a light interfering layer which enables the phase-change recording layer to absorb effectively the light.

Examples of a material of the first protective layer are metallic oxides such as SiO, $SiO_2$, ZnO, $SnO_2$, $Al_2O_3$, $TiO_2$, $In_2O_3$, MgO and $ZrO_2$; nitrides such as $Si_3N_4$, AlN, TiN, BN and ZrN; sulfides such as ZnS, $In_2S_3$ and $TaS_4$; carbides such as SiC, TaC, B4C, WC, TiC and ZrC, diamond-like carbon; and mixtures thereof. Among these, a mixture of ZnS and $SiO_2$ is preferable.

Examples of a formation method of the second protective layer 4 include various vapor growth methods such as vacuum vapor deposition method, sputtering method, plasma CVD method, optical CVD method, ion plating method and electron beam vapor deposition method. Among these, the sputtering method is excellent from a point of mass productivity and film quality. Preferable sputtering conditions are, for example, the use of an Ar gas as a film-making gas, an input electric power of 3 kW and the Ar gas pressure (the pressure of a film-making chamber) of $2\times10^{-3}$ Torr.

There is no restriction in particular on the film thickness of the second protective layer, and it can be selected appropriately according to the object. The film thickness of 6 nm to 20 nm is preferable.

When the film thickness of the second protective layer is small, the recording sensitivity degrades sometimes; when the film thickness is large, too much heat is confined sometimes.

Reflective Layer

While assuming a role as a light reflecting layer on one hand, the reflective layer also assumes a role as a heat releasing layer which releases the heat added to the phase-change recording layer by the irradiation of a laser beam in recording. Since the formation of the amorphous mark depends largely on the cooling speed by releasing heat, the selection of the reflective layer is important for the phase-change optical recording medium for high linear velocity.

For the reflective layer 6, metallic materials such as Al, Au, Ag, cu, and Ta, and alloys thereof can be used. Moreover, Cr, Ti, Si, Cu, Ag, Pd, and Ta can be used as additional elements to these metallic materials. Among these, any one of Ag, an alloy of Ag, and Ag—Cu, Ag—Pd, Ag—Pd—Cu, Ag—Nd—Cu, and Ag—Bi is a suitable example of the Ag alloy. This is because, for the reflective layer which forms the phase-change optical recording medium, a metal having a high thermal conductivity/high reflectivity is generally preferable in terms of thermal conductivity which adjusts the cooling speed of the heat developed at the time of recording as well as an optical point of view of improving the contrast of a reproducing signal by using an interference effect; regarding pure Ag or an alloy of Ag, Ag has an extremely high thermal conductivity of 427 W/m·K, and an quenching structure suitable for the formation of an amorphous mark can be realized immediately after the phase-change recording layer reaches a high temperature in recording.

Moreover, when such high thermal conductivity is taken into consideration, pure silver is the most favorable, and taking into consideration a corrosion resistance, Cu may be added. In this case, in order not to sacrifice the properties of Ag, the amount of copper to be added is preferably about 0.1 atom percent to 10 atom percent, and more preferably 0.5 atom percent to 3 atom percent. Sometimes, an excessive addition of copper degrades the high thermal conductivity of Ag.

The reflective layer 6 can be formed by various vapor growth methods such as vacuum vapor deposition method, sputtering method, plasma CVD method, optical CVD method, ion plating method and electron beam vapor deposition method. Among these, the sputtering method is excellent from a point of mass productivity and film quality. Preferable sputtering conditions are, for example, the use of an Ar gas as a film-making gas, an input electric power of 3 kW and the Ar gas pressure (the pressure of a film-making chamber) of $2\times10^{-3}$ Torr.

The heat releasing capability of the reflective layer depends basically on the thickness of the layer and favorable disc properties can be achieved when the film thickness of the reflective layer is 60 nm or more. In this case, there is no upper limit in particular to the thickness, and the thickness may be in a range acceptable in view of manufacturing cost of the disc; approximately 300 nm or less is desirable.

Moreover, a resin protective layer can be further provided on the reflective layer according to the requirement. The resin protective layer has an effect of protecting the phase-change recording layer during the processes and after the release as a product and is usually formed of an ultraviolet curing resin. The film thickness of the resin protective layer is preferably 2 µm to 5 µm.

Third Protective Layer

It is preferable to provide the third protective layer 5 between the second protective layer 4 and the reflective layer 6.

Examples of a material of the third protective layer 5 include Si, SiC, SiN, $SiO^2$, TiC, $TiO_2$, TiC—$TiO_2$, NbC, $NbO_2$, NbV—$NbO_2$, $Ta_2O_5$, $Al_2O_3$, ITO, GeN and $ZrO_2$, and among these TiC—$TiO_2$, Si or SiC is particularly preferable owing to the high barrier property.

When pure Ag or Ag alloy is used for the reflective layer and a protective layer comprising sulfur such as a mixture of ZnS and $SiO_2$, sulfur is diffused in Ag, and a problem such as disc defect occurs (sulfuration reaction of Ag). Therefore, as a third protective layer which prevents such reaction, it is desirable to select a suitable material from a view point of (1) having a barrier capability to prevent the sulfuration reaction, (2) being optically transparent to the laser beam, (3) having a low thermal conductivity for the formation of an amorphous mark, (4) having good adhesion with the protective layer and the reflective layer, and (5) being easily formed; and a material comprising TiC—$TiO_2$, Si or SiC as a main constituent which satisfies the abovementioned requirements is preferable as a constituent material for the third protective layer.

The third protective layer has a film thickness of preferably 2 nm to 20 nm, and more preferably 2 nm to 10 nm. When the film thickness is less than 2 nm, the third protective layer sometimes does not function as a barrier layer; when the film thickness exceeds 20 nm, it may lead to degradation of modulation.

Interfacial Layer

It is preferable to provide the interfacial layer between the first protective layer 2 and the phase-change recording layer 3, or between the phase-change recording layer and the second protective layer.

As a material of the interfacial layer, oxides, complex oxides and nitrides are preferable for favorable permeability. Among these, $ZrO_2$, $TiO_2$, $Y_2O_3$ and their complex oxides, $Al_2O_3$, are given as examples.

The interfacial layer preferably has a film thickness of 1 nm to 10 nm. Accordingly, since it is possible to reduce the damage the substrate receives in recording with high power, the rewriting performance at the high power recording improves, and it is possible to widen the write power margin.

Optical Recording Apparatus

The optical recording apparatus of the present invention is used for the optical recording method of the present invention, in which the optical recording medium of the present invention is mounted, and further comprises other units according to the requirement.

The optical recording apparatus performs recording at a recording linear velocity of 3 m/s to 56 m/s, and more preferably 5.5 m/s to 42 m/s.

There is no restriction in particular on the optical recording apparatus, and the optical recording apparatus can be selected appropriately according to the object; the optical recording apparatus comprises: a laser beam source which is a light source such as semiconductor laser that irradiates laser beam; a condenser lens which focuses the laser beam irradiated from the laser beam source on the optical recording medium mounted on a spindle; and a laser beam detector which detects a reflected light of the laser beam; and an optical element which guides the laser beam irradiated from the laser beam source to the condenser lens and a laser beam detector; it may also comprises other means according to the requirement.

In this case, the optical recording apparatus preferably comprises a peculiar recording velocity which is a recording linear velocity at which jitter abruptly degrades to show a local maximum value, and a test zone which is allocated on the inner side or outer side of the date region used by a user based on the information detected in the phase-change optical recording medium on which the information regarding the peculiar recording velocity and the optimum recording conditions are recorded in advance, and the optical recording apparatus comprises a means to perform test recording in the test zone at a linear velocity ranging up to ±2 m/s of the peculiar recording linear velocity.

The optical recording apparatus guides the laser beam irradiated from the laser beam source to the condenser lens by the optical element, and the recording is performed in the optical recording medium by focused irradiation of the laser light on the phase-change optical recording medium by the condenser lens. At this time, the optical recording apparatus guides the reflected light of the laser beam to the laser beam detector, and based on an amount detected of the laser beam by the laser beam detector, controls the intensity of the laser beam source.

The laser beam detector converts the amount of light detected into a voltage or a current, and it outputs as a detected amount signal.

An example of the other means is a control means. There is no particular restriction on the control means provided that the control means can control the movement of each means, and it can be selected appropriately according to the requirement. Examples thereof include a computer and a sequencer used for irradiating and scanning a laser beam with intensity modulation.

Figure 8:
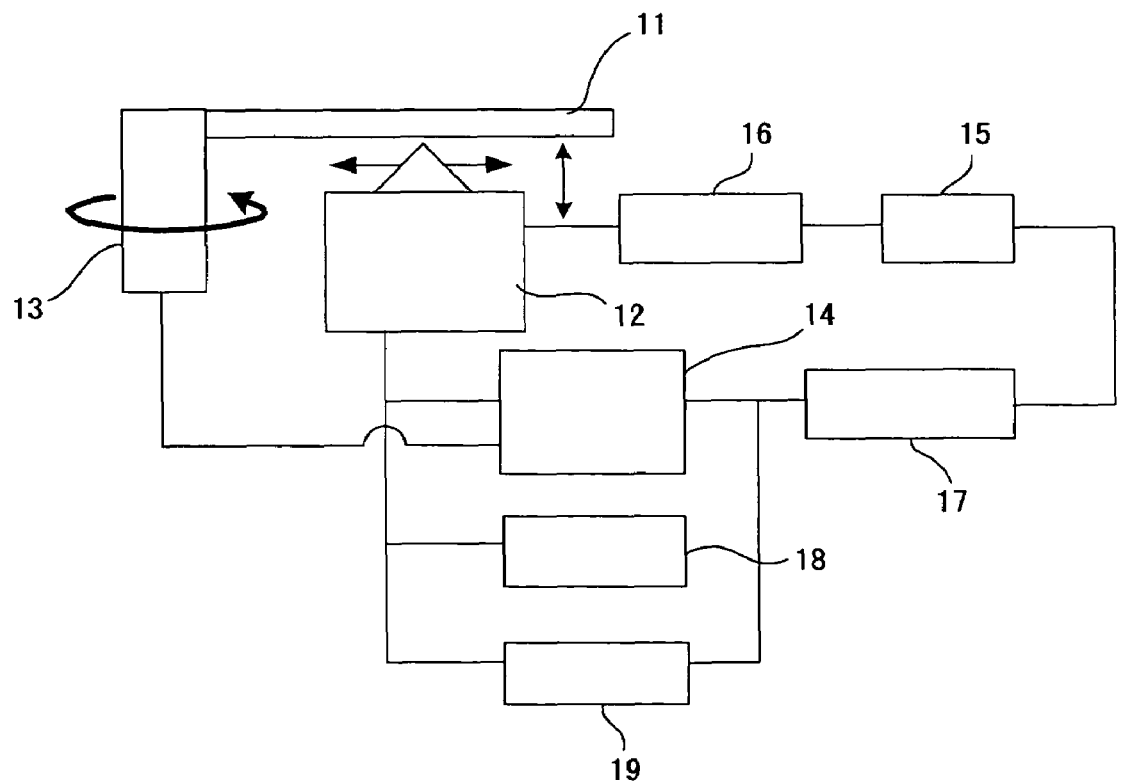
FIG. 8 is a schematic diagram showing an example of an optical recording apparatus used in the present invention.

Here, an example of the optical recording apparatus of the present invention is described with reference to FIG. 8.

This optical recording apparatus comprises: an optical system which comprises an LD (laser diode) for recording and reproducing information on a phase-change optical recording medium 11, an object lens, a deflection beam splitter, a λ/4 wavelength plate and a PD (photo detector); a pick-up section 12 which comprises an actuator which moves the optical system for focusing and tracking at a predetermined recording position (address position) of the optical recording medium; and a spindle motor 13 for rotating the optical recording medium. It is possible to record and reproduce information at a predetermined recording linear velocity at a predetermined address. In FIG. 8, 14 denotes a decoder, 15 denotes an encoder, 16 denotes an LD driving circuit, 17 denotes a clock-generating circuit, 18 denotes a focusing servo, and 19 denotes a tracking servo.

Regarding an address, a groove comprising a wobble is formed in advance in the substrate of the phase-change optical recording medium, and address information is input by means of a phase modulation. The decoder 14 for decoding this address and the clock-generating circuit 17 for generating a reference clock from the wobble portion which modulates at a constant cycle are provided apart from information such as address.

Information sent from a computer (not shown in the diagram) is converted to a signal modulated on a (8-17) modulation basis by the encoder 15 and is recorded in the optical recording medium 11 by a light-emitting pulse output from the LD driving circuit 16 for recording the signal. The spindle motor 13 has a capacity of 10,000 rpm; however, the number of rotations exceeds its capacity with the recording linear velocity at the inner most circumference (radius of 24 mm) when the recording is performed at the maximum of 35 m/s on the outermost circumference (radius of 58 mm); therefore, the CAV recording method is adopted. In this case, the recording linear velocity of the innermost circumference is set at 14 m/s, and the number of rotations is set at approximately 6,000 rpm.

According to the optical recording apparatus of the present invention, uniform and favorable recording characteristics can be achieved for the phase-change optical recording medium independent of the recording radial position even when the CAV recording is performed in which the recording linear velocity increases continuously from the inner circumference portion toward the outer circumference portion.

Although the present invention is described below in detail with examples, the present invention is not to be restricted at all to the following examples.

EXAMPLE 1

A substrate made of a polycarbonate resin having a tracking pitch of 0.74 μm, a groove depth of 27 nm, a diameter of 12 cm and a thickness of 0.6 mm was prepared.

First of all, a first protective layer having a film thickness of 55 nm and comprising ZnS and $SiO_2$ where ZnS:$SiO_2$=80:20 (mole %) was formed by the sputtering method on the substrate.

Next, a phase-change recording layer having a film thickness of 12 nm and comprising $Ge_{3.8}Ag_{0.3}In_{3.5}Sb_{72}Te_{20.4}$ was formed by the sputtering method on the first protective layer.

Next, an interfacial layer having a film thickness of 3 nm and comprising $ZrO_2.TiO_2$ and TiO where [$ZrO_2.TiO_2$ (with three mole % of $TiO_2$)]:TiO=80:20 (mole %) was formed by the sputtering method on the phase-change recording layer.

Next, a second protective layer having a film thickness of 11 nm and comprising ZnS and $SiO_2$ where ZnS:$SiO_2$=80:20 (mole %) was formed by the sputtering method on the interfacial layer.

Next, a sulfuration preventing layer having a film thickness of 4 nm and comprising SiC was formed by the sputtering method on the second protective layer.

Next, a reflective layer having a film thickness of 140 nm and comprising Ag was formed by the sputtering method on the sulfuration preventing layer.

Next, an environment resistant protective layer having a film thickness of 5 μm and comprising an ultraviolet curing resin (SD 318: manufactured by Dai Nippon Ink And Chemical Industries Ltd.) on the reflective layer for improving the receptivity to the environment.

Finally, another substrate (without films) equivalent to the substrate mentioned above was laminated using an ultraviolet curing resin (DVD 003: manufactured by Nippon Kayaku Co., Ltd.), and an optical recording medium was obtained.

Next, for the optical recording medium obtained, the phase-change recording layer was crystallized by an initialization process.

In the optical recording medium obtained, a recording was performed with recording conditions shown in Table 1 by using an LD (laser diode) having a numerical aperture NA of 0.65 and a wavelength of 660 nm. The number of pulses of each mark length was set as n-1 where n=3 to 14, and the recording linear velocity was set in a range of 5.8 m/s (1.65× speed of DVD) to 14 m/s (4× speed of DVD).

The relations of symbols in Table 1 and symbols in FIG. 1 are that OP1≡Ttop and OPi≡Tmp. An intermediate portion of the pulse string excluding the last pulse string was set such that OPi+FPj=T. The final portion of the cooling pulse FPm was controlled by a time Δ2 from the position B in FIG. 1 and an final portion of heating pulse OPi.

When the control is based on the relation FPm+OPi+Δ2=T, FPm=T-(OPi+Δ2), and the sign of Δ2 is positive.

When FPm+OPi>T, the sign of Δ2 becomes negative in FPm=T-(OPi+Δ2). This means that Δ2 is on the rear side of the position B and that the final portion of the cooling pulse becomes long.

Moreover, the leading portion of the head heating pulse is controlled with a time delayed by T from the position A as a reference, and this time is let to be Δ1. When starting earlier than the reference position, the sign of Δ1 becomes positive, and when delaying, the sign becomes negative. Here, dTtop and dTera in Table 1 are dTtop≡Δ1 and dTera≡Δ2, respectively.

TABLE 1

| Recording linear velocity (m/s) | dTop | Ttop (nsec) | Tmp (nsec) | dTera | Pp(mW) |
|---|---|---|---|---|---|
| 9.9 | 0 | 6T/16 + 2.4 | 3T/16 + 3 | 0 | 17.5 |
| 10.1 | 0 | | | T/16 | 17.5 |
| 10.5 | -T/16 | | | 3T/16 | 17.5 |
| 11.9 | -T/16 | | | 4T/16 | 18.0 |
| 12.2 | -T/16 | | | 5T/16 | 18.0 |
| 12.6 | -T/16 | | | 6T/16 | 18.0 |
| 12.9 | -T/16 | | | 7T/16 | 18.0 |
| 13.3 | -2T/16 | | | 7T/16 | 18.5 |
| 13.6 | -2T/16 | | | 8T/16 | 18.5 |
| 14.0 | -2T/16 | | | 8T/16 | 18.5 |

For the optical recording medium obtained in Example 1, a recording was performed at each recording linear velocity, and jitter for which the degradation of properties was particularly prominent was examined.

When the recording linear velocity was varied while irradiating continuously one tracking cycle at a panel surface power of 11 mW, the recording linear velocity for which a local decrease of the reflectivity of the optical recording medium was observed was 10.5 m/s. This recording linear velocity is higher than the mean recording linear velocity of (5.8 m/s+14 m/s)/2=9.9 m/s.

The results are shown in Table. 2. For a range of 5.8 m/s to 9.9 m/s, the jitter in recording was 7.2% with conditions of linear velocity of 5.8 m/s, write power of 17.5 mW, ε (=Pe/Pp) of 0.50, was 7.2%, and the jitter was 9% or less when ε (=Pe/Pp) was fixed to ε=0.50 up to the velocity of 9.9 m/s.

Figure 2:
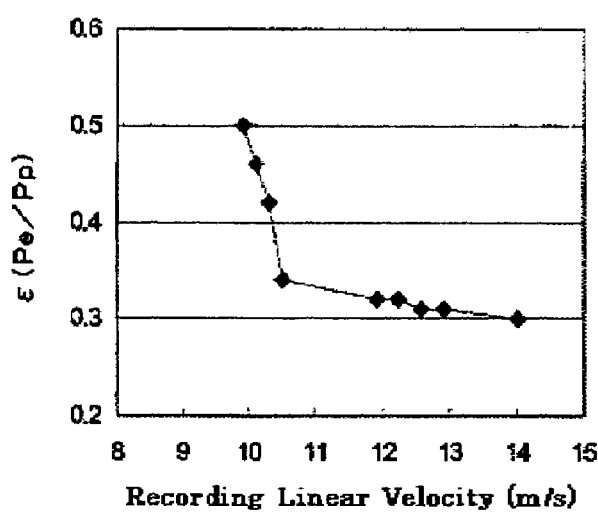
FIG. 2 is a diagram showing the relation of a recording linear velocity and $\epsilon$ (=Pe/Pp) in Example 1.
Figure 3:
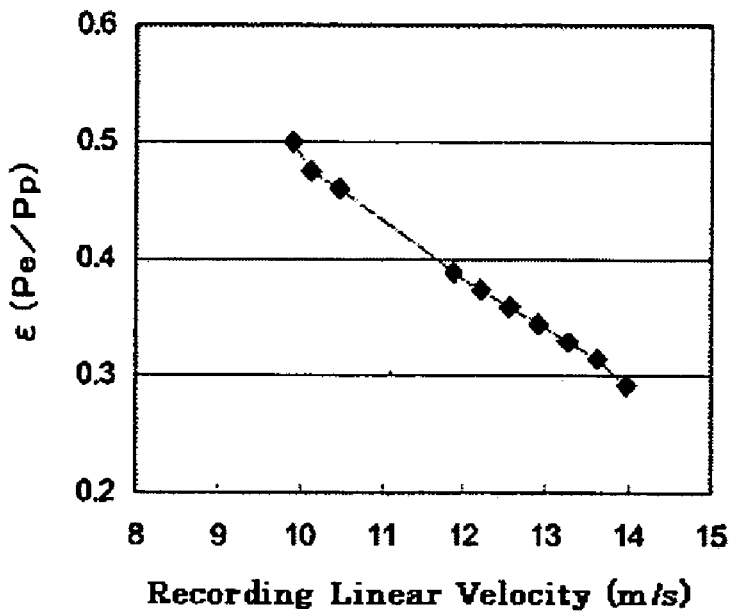
FIG. 3 is a diagram showing the relation of the recording linear velocity and $\epsilon$ (=Pe/Pp) in Comparative Example 1.

The peculiar recording linear velocity of this optical recording medium was 12.9 m/s as shown in FIG. 6, but as shown in FIG. 2, the ε (=Pe/Pp) was changed at the recording linear velocity of 10.5 m/s, which was lower by 2.4 m/s than the peculiar recording linear velocity. From 10.5 m/s to 12.9 m/s, ε was changed such that it decreased monotonously. ε (=Pe/Pp) from the minimum recording linear velocity (5.8 m/s) to the mean recording linear velocity (9.9 m/s) was fixed to 0.5. The jitter after overwriting 10 times at all the recording linear velocities was less than the reference value of 9%.

The jitter was measured using a time interval analyzer (manufactured by Yokogawa Electric Corporation). Moreover, recording and reproducing were performed using an optical disc evaluation system (DDU-100: manufactured by Pulstec Industrial Co., Ltd.).

TABLE 2

| Recording linear | Example 1 | |
|---|---|---|
| velocity (m/s) | ε (Pe/Pp) | Jitter after overwriting 10 times (%) |
| 9.9 | 0.50 | 7.6 |
| 10.1 | 0.46 | 8.4 |
| 10.3 | 0.42 | 8.3 |
| 10.5 | 0.34 | 8.2 |
| 11.9 | 0.32 | 8.0 |
| 12.2 | 0.32 | 7.7 |
| 12.6 | 0.31 | 8.0 |
| 12.9 | 0.31 | 8.3 |
| 14.0 | 0.3 | 7.8 |

COMPARATIVE EXAMPLE 1

For the same optical recording medium as in Example 1, a change in the jitter was measured similarly to Example 1, except that the recording while decreasing ε (=Pe/Pp) monotonously from the mean recording linear velocity (9.9 m/s) to the maximum recording linear velocity (14 m/s). The results are shown in Table 3.

TABLE 3

| Recording linear | Comparative Example 1 | |
|---|---|---|
| velocity (m/s) | ε (Pe/Pp) | Jitter after overwriting 10 times (%) |
| 9.9 | 0.50 | 7.6 |
| 10.1 | 0.48 | 7.5 |
| 10.5 | 0.46 | 7.8 |
| 11.9 | 0.39 | 8.0 |
| 12.2 | 0.37 | 8.3 |
| 12.6 | 0.35 | 8.4 |

TABLE 3-continued

| Recording linear velocity (m/s) | Comparative Example 1 | |
|---|---|---|
| | ε (Pe/Pp) | Jitter after overwriting 10 times (%) |
| 12.9 | 0.34 | 9.8 |
| 13.3 | 0.33 | 9.3 |
| 13.6 | 0.31 | 8.2 |
| 14.0 | 0.29 | 7.8 |

The results in Table 3 indicate that, at the peculiar recording linear velocity (12.9 m/s) the jitter after overwriting 10 times degraded to 9.8%.

EXAMPLE 2

For the same optical recording medium as in Example 1, the change in the jitter was measured and tabulated similarly to Example 1 except that the erase power (Pe) was specified and varied at the minimum recording linear velocity (5.8 m/s), the mean recording linear velocity (9.9 m/s), the peculiar recording linear velocity (10.5 m/s), and the maximum recording linear velocity (14.0 m/s). The results are shown in Table 4.

TABLE 4

| Recording linear velocity (m/s) | | Jitter after overwriting 10 times (%) | Pe (mW) |
|---|---|---|---|
| Minimum recording linear velocity | 5.8 | 7.2 | 9.0 |
| Mean recording linear velocity | 9.9 | 7.6 | 9.0 |
| Peculiar recording linear velocity | 10.5 | 8.2 | 5.6 |
| Maximum recording linear velocity | 14.0 | 7.4 | 5.6 |

From the results in Table 4, an optimum write power (Pp) at each recording linear velocity was 18 mW, 18 mW, 18 mW and 19.5 mW, respectively.

EXAMPLE 3

An optical recording medium of Example 3 was prepared similarly to Example 1 except that the material of the phase-change recording layer was changed to $Ga_{10}Sn_2Sb_{88}$, as a phase-change optical recording medium for recording at recording linear velocities of 11.5 m/s at the innermost circumference of and 27.9 m/s at the outermost circumference.

For the phase-change optical recording medium obtained, the recording linear velocity was varied while irradiating continuously the erase power having a magnitude of 15 mW, and the recording linear velocity at which the local degradation of the reflectivity started to occur, i.e. the transition recording linear velocity, was 19.5 m/s.

The recording conditions of the maximum recording linear velocity are shown in Table 5.

Although in this case the same recording parameters as in FIG. 1 were used, the relation of OPi+FPj=T was not there, and the parameter Δ2 was not used. Each value indicates a pulse width of each pulse (OP, FP) in the order from the leading portion.

Figure 4:
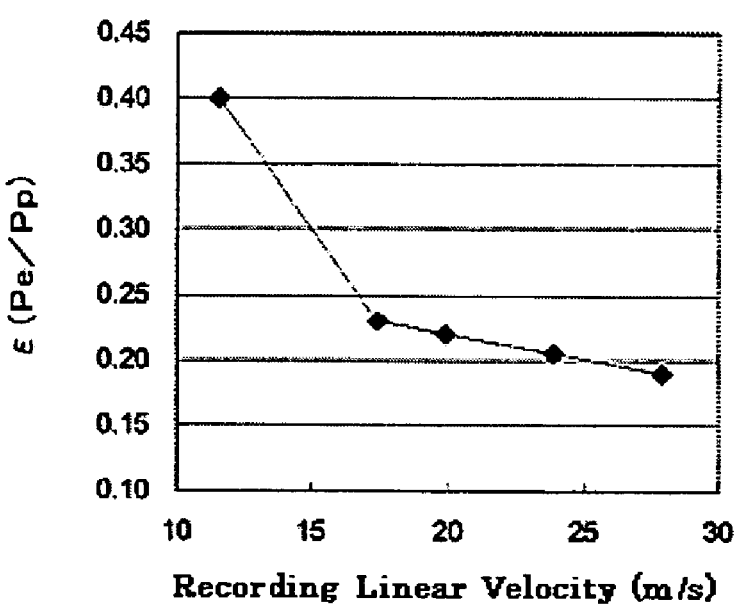
FIG. 4 is a diagram showing the relation of the recording linear velocity and $\epsilon$ (=Pe/Pp) in Example 3.
Figure 5:
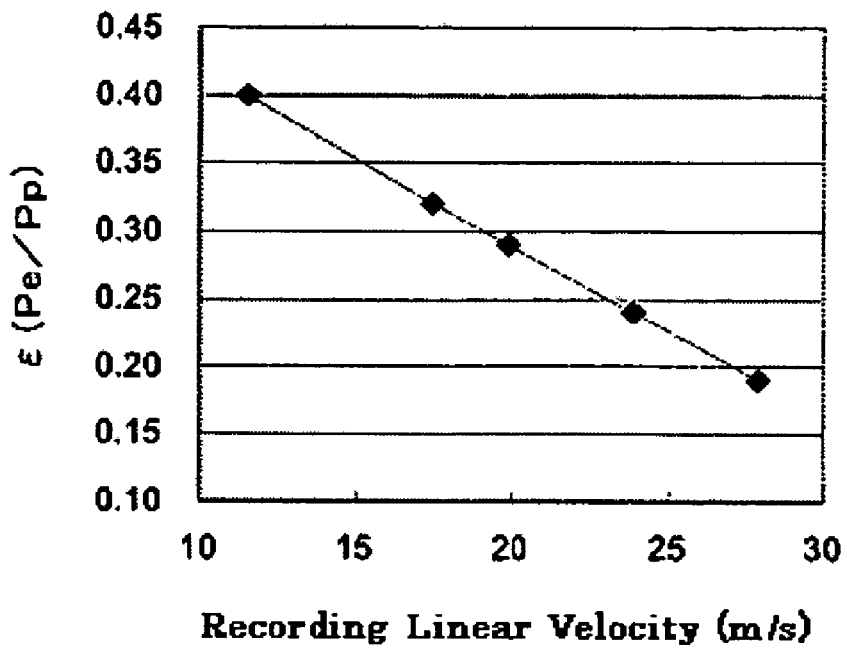
FIG. 5 is a diagram showing the relation of the recording linear velocity and $\epsilon$ (=Pe/Pp) in Comparative Example 2.

At the maximum recording linear velocity of 27.9 m/s, the clock T was 4.8 nsec. The width of each pulse at the minimum recording linear velocity was 0.9 times as that at the maximum recording linear velocity, and the recording linear velocity between these was optimized therebetween. Here, ε (=Pe/Pp) had a dependency on the recording linear velocity shown in FIG. 4.

The peculiar recording linear velocity of this optical recording medium was 23 m/s. Given this, when ε (=Pe/Pp) was reduced down to 0.22 from the mean recording linear velocity, as shown in Table 6, the jitter after overwriting 10 times was found to be 9% or less at all the recording linear velocities.

TABLE 5

| mark | Δ1 | OP1 | FP1 | OP2 | FP2 | OP3 | FP3 | OP4 | FP4 | OP5 | FP5 | OP6 | FP6 | OP7 | FP7 |
|---|---|---|---|---|---|---|---|---|---|---|---|---|---|---|---|
| 3T | 0.2 | 1.05 | 1.05 | | | | | | | | | | | | |
| 4T | 0.2 | 1.05 | 0.84 | 0.84 | 1.15 | | | | | | | | | | |
| 5T | 0.0 | 1.15 | 1.05 | 1.05 | 1.05 | | | | | | | | | | |
| 6T | 0.0 | 1.05 | 1.05 | 0.84 | 1.05 | 0.84 | 1.15 | | | | | | | | |
| 7T | 0.0 | 1.25 | 1.05 | 1.05 | 1.05 | 1.05 | 1.05 | | | | | | | | |
| 8T | 0.0 | 1.05 | 1.05 | 0.84 | 1.05 | 0.84 | 1.05 | 0.84 | 1.05 | | | | | | |
| 9T | 0.0 | 1.25 | 1.05 | 1.05 | 1.05 | 1.05 | 1.05 | 1.05 | 1.05 | | | | | | |
| 10T | 0.0 | 1.05 | 1.05 | 1.05 | 1.05 | 0.84 | 1.05 | 0.84 | 1.05 | 0.84 | 1.05 | | | | |
| 11T | 0.0 | 1.25 | 1.05 | 1.05 | 1.05 | 1.05 | 1.05 | 1.05 | 1.05 | 1.05 | 1.05 | | | | |
| 14T | 0.0 | 1.05 | 1.05 | 0.84 | 1.05 | 0.84 | 1.05 | 0.84 | 1.05 | 0.84 | 1.05 | 0.84 | 1.05 | 0.84 | 1.05 |

Unit: T

TABLE 6

| | Example 3 | | |
|---|---|---|---|
| Recording linear velocity (m/s) | Pp (mW) | ε (Pe/Pp) | Jitter after overwriting 10 times (%) |
| 11.5 | 25 | 0.27 | 7.7 |
| 17.5 | 26 | 0.23 | 7.5 |
| 19.9 | 27 | 0.21 | 7.9 |
| 23.0 | 30 | 0.20 | 8.6 |
| 27.9 | 32 | 0.17 | 8.3 |

COMPARATIVE EXAMPLE 2

For the same optical recording medium as in Example 3, the change in the jitter was measured similarly to Example 1 except that ε (=Pe/Pp) between two linear velocities were linearly varied based on ε (=Pe/Pp) which is determined by the maximum recording linear velocity (27.9 m/s) and the minimum recording linear velocity (11.5 m/s). The results are shown in Table 7

TABLE 7

| | Comparative Example 2 | | |
|---|---|---|---|
| Recording linear velocity (m/s) | Pp (mW) | ε (Pe/Pp) | Jitter after overwriting 10 times (%) |
| 11.5 | 25 | 0.27 | 7.7 |
| 17.5 | 26 | 0.26 | 7.9 |
| 19.9 | 27 | 0.25 | 7.5 |
| 23.0 | 30 | 0.22 | 10.5 |
| 27.9 | 32 | 0.17 | 8.3 |

The results in Table 7 indicate that the jitter after overwriting for ten times exceeds 10% at the recording linear velocity (23.0 m/s) between the mean recording linear velocity and the maximum recording linear velocity.

EXAMPLE 4

Information regarding the recording conditions stored in advance in the substrate of the optical recording medium to comply with the CAV recording using the optical recording medium and the recording conditions used in Example 3 includes: the minimum recording linear velocity (11.5 m/s); the specific recording linear velocity (19.9 m/s) lower than the peculiar recording linear velocity; the maximum recording linear velocity (27.9 m/s) ; and parameters required for determining recording conditions (heating, cooling pulse irradiation time, optimum peak power (Pp), Pe/Pp, bottom power (Pb), and optimum write power) for each recording linear velocity in the optical recording apparatus; which were determined.

Each value was formed in a groove portion of a predetermined address range on the inner side of a user region (radius of 24 mm to 58 mm) and the outer side of a radial position of 22 mm, and an ADIP (Address in pre-groove) recording was performed by modulating the phase of a wobble portion meandering at a fixed cycle.

The groove width of the meandering groove was changed in a sinusoidal form, and the meandering groove was formed by a photolithographic method at the same time as forming the groove. One cycle of a wobble was set at 818 kHz, and the portion for which the phase was shifted by 180° was a modulation portion. Moreover, the wobbles were categorized according to the direction of either the positive or negative side to which the amplitude of the wobble changed. By determining the number of these positive and negative wobbles, '0' and '1' were defined. For example, the combination of one portion changed to the negative side, five portions changed to the positive side, and two portions changed to the negative side in this order in a certain continuous range was defined as '0'.

By inputting in advance the recording conditions for each optical recording medium, a favorable recording independent of the optical recording medium has become possible even though there is an inherent peculiar recording linear velocity for the optical recording medium.

EXAMPLE 5

In Example 1, ε (=Pe/Pp) between the minimum recording linear velocity (5.8 m/s) and the mean recording linear velocity (9.9 m/s) is set constant independent of the recording linear velocity; between the mean recording linear velocity and the specific recording linear velocity (10.5 m/s), every time the recording linear velocity was increased by 0.1 m/s, ε (=Pe/Pp) was reduced in stepwise of 0.03, and between the peculiar recording linear velocity (12.9 m/s) and the maximum recording linear velocity (14 m/s), every time the recording linear velocity was increased by 0.9 m/s, ε (=Pe/Pp) was reduced in stepwise of 0.01.

Moreover, from an address at which the recording linear velocity reached 10.5 m/s up to an address closest to a radial position at which the recording linear velocity changed by 0.1 m/s, the peak power (Pp) and the erase power (Pe) determined by a certain ε were emitted.

Furthermore, an optical recording apparatus was used, where a laser driver was controlled such that an optimum power was irradiated according to the address to the optical recording medium in order to perform a recording with the optimum conditions similarly in a recording area with the recording linear velocity increased by 0.1 m/s. Accordingly, a favorable recording independent of the recording linear velocity became possible even with the CAV recording.

EXAMPLE 6

For the same phase-change optical recording medium as in Example 1, information was input in advance in the ADIP (Address in pre-groove) of the optical recording medium while letting the peculiar recording linear velocity to be 12.5 m/s. The minimum recording linear velocity was 5.8 m/s, and the maximum recording linear velocity was 14 m/s. Furthermore, apart from this information, information related to the optimum recording conditions at each recording linear velocity was recorded. The conditions at 12.6 m/s in Table 1 and Table 2 were recorded as the recording conditions at the peculiar recording linear velocity.

First of all, this information was recorded in a reading control zone.

Next, in a test zone for drive which is near the radius of 23.4 mm of the phase-change optical recording medium, 1,000 sectors were recorded at a recording linear velocity lower by 0.5 m/s than 12.5 m/s, and the errors were measured in this area. The number of errors stipulated for DVD-ROM exceeded 280.

Moreover, when the recording was performed similarly at a recording linear velocity of 11.5 m/s which was lower by 1 m/s than 12.5 m/s, the number of errors was 280 or less.

As a result, the information of the peculiar recording linear velocity in the control zone was rewritten to this 11.5 m/s.

Compared to the information determined in advance by the manufacturer of the optical recording medium, there is a variation in the peak power (Pp), the erase power (Pe) and a time of an emission pulse depending on the optical recording apparatus. Therefore, they do not necessarily coincide with the conditions determined by the manufacturer of the optical recording medium near the peculiar recording linear velocity. However, in Example 6, the reliability was improved by finding a favorable optimum recording linear velocity in the optical recording apparatus.

INDUSTRIAL APPLICABILITY

A phase-change optical recording medium of the present invention is capable of performing a highly reliable recording, and it is possible to improve the recording characteristics as well as uniformity by devising a high-speed rewritable DVD optical recording medium on a recording method for a CAV recording. It is used extensively for various phase-change optical recording media, particularly DVD optical recording media such as DVD-RAM, DVD-RW and DVD+RW.

What is claimed is:

1. An optical recording method of a phase-change optical recording medium comprising:

controlling an irradiation power by three values, namely a peak power (Pp) which is the irradiation power of a heating pulse, a bottom power (Pb) which is the irradiation power of a cooling pulse and an erase power (Pe) for erasing a recording mark; and recording by varying an irradiation time of each pulse in proportion with a clock T corresponding to the recording linear velocity, wherein the phase-change optical recording medium comprises a phase-change recording layer on a substrate, wherein a light irradiated on the phase-change optical recording medium comprises a pulse string of heating pulses and cooling pulses, and a light for erasing, wherein at least any one of Pe/Pp, Pp, Pb and Pe is set variable within a range from the minimum recording linear velocity to the maximum recording linear velocity of the phase-change optical recording medium, wherein a peculiar recording linear velocity is a recording linear velocity at which jitter degrades abruptly to show a local maximum value, and wherein the optical recording method performs a recording by varying at least Pe/Pp from a specific recording linear velocity which is lower than the peculiar recording linear velocity.

2. The optical recording method according to claim 1, wherein the specific recording linear velocity is a recording linear velocity lower by 0.5 m/s or more than the peculiar recording linear velocity.

3. The optical recording method according to claim 1, wherein the optical recording method performs at least any one of a recording, a reproducing, an erasing and a rewriting of information by a reversible phase change of an amorphous phase and a crystal phase in the phase-change recording layer.

4. The optical recording method according to claim 1, wherein the recording in the phase-change optical recording medium is performed by a CAV recording method.

5. The optical recording method according to claim 1, wherein the recording is performed by further changing Pe.

6. The optical recording method according to claim 1, wherein one of Pe/Pp and Pe at the specific recording linear velocity is equal to or greater than one of Pe/Pp and Pe at the maximum recording linear velocity.

7. The optical recording method according to claim 1, wherein any one of Pe/Pp and Pe between two recording linear velocities to which any one of differing Pe/Pp and Pe is imparted is varied by one of a constant rate and a constant interval.

8. An optical recording apparatus comprising a laser beam source, wherein the optical recording apparatus performs a recording at a recording linear velocity of 3 m/s to 56 m/s using the optical recording method, wherein the optical recording method comprises:

controlling an irradiation power by three values, namely a peak power (Pp) which is the irradiation power of a heating pulse, a bottom power (Pb) which is the irradiation power of a cooling pulse and an erase power (Pe) for erasing a recording mark; and recording by varying an irradiation time of each pulse in proportion with a clock T corresponding to the recording linear velocity, wherein the phase-change optical recording medium comprises a phase-change recording layer on a substrate, wherein a light irradiated on the phase-change optical recording medium comprises a pulse string of heating pulses and cooling pulses, and a light for erasing, wherein at least any one of Pe/Pp, Pp, Pb and Pe is set variable within a range from the minimum recording linear velocity to the maximum recording linear velocity of the phase-change optical recording medium, wherein a peculiar recording linear velocity is a recording linear velocity at which jitter degrades abruptly to show a local maximum value, and wherein the optical recording method performs a recording by varying at least Pe/Pp from a specific recording linear velocity which is lower than the peculiar recording linear velocity.

9. The optical recording apparatus according to claim 8, wherein the optical recording apparatus comprises a peculiar recording velocity, which is a recording linear velocity at which jitter abruptly degrades to show a local maximum value, and a test zone which is allocated on the inner side or outer side of the date region used by a user based on the information detected in the phase-change optical recording medium on which the information regarding the peculiar recording velocity and the optimum recording conditions have been recorded in advance, and the optical recording apparatus comprises a means to perform a test recording in the test zone at a linear velocity ranging up to ±2 m/s of the peculiar recording linear velocity.

* * * * *

UNITED STATES PATENT AND TRADEMARK OFFICE
CERTIFICATE OF CORRECTION

PATENT NO. : 7,570,563 B2  Page 1 of 1
APPLICATION NO. : 11/353000
DATED : August 4, 2009
INVENTOR(S) : Yuzurihara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this

Seventh Day of September, 2010

David J. Kappos
*Director of the United States Patent and Trademark Office*